United States Patent [19]

Akiyama

[11] Patent Number: 5,051,857
[45] Date of Patent: Sep. 24, 1991

[54] DISC CARTRIDGE HAVING A SLIDINGLY MOVABLE SHUTTER

[75] Inventor: Noboru Akiyama, Kyoto, Japan

[73] Assignee: Dai Nippon Insatsu K.K., Tokyo, Japan

[21] Appl. No.: 373,020

[22] Filed: Jun. 28, 1989

[30] Foreign Application Priority Data

| Jun. 29, 1988 | [JP] | Japan | 63-85103[U] |
| Jun. 29, 1988 | [JP] | Japan | 63-85106[U] |
| Jun. 29, 1988 | [JP] | Japan | 63-85107[U] |
| Jun. 29, 1988 | [JP] | Japan | 63-85109[U] |
| Jun. 29, 1988 | [JP] | Japan | 63085108[U] |

[51] Int. Cl.$^5$ .............................................. G11B 23/03
[52] U.S. Cl. ................................................... 360/133
[58] Field of Search ............... 360/133, 97.1; 206/444; 369/291

[56] References Cited

U.S. PATENT DOCUMENTS

| 4,546,397 | 10/1985 | Asami et al. | 360/133 |
| 4,589,105 | 5/1986 | Nemoto et al. | 360/133 |
| 4,626,949 | 12/1986 | Brock et al. | 360/133 |
| 4,660,118 | 4/1987 | Faber | 360/133 |
| 4,710,839 | 12/1987 | Iizuka et al. | 360/133 |
| 4,787,006 | 11/1988 | Iizuka et al. | 360/133 |
| 4,794,480 | 12/1988 | Jones et al. | 360/133 |
| 4,797,770 | 1/1989 | Takahasi | 360/133 |
| 4,835,638 | 5/1989 | Takeda | 360/133 |
| 4,853,925 | 8/1989 | Kaneuchi | 360/133 |
| 4,858,050 | 8/1989 | Ashe et al. | 360/133 |

FOREIGN PATENT DOCUMENTS

| 248908 | 12/1987 | European Pat. Off. . | |
| 0145582 | 8/1985 | Japan | 360/133 |

Primary Examiner—David J. Severin
Attorney, Agent, or Firm—Sughrue, Mion, Zinn Macpeak & Seas

[57] ABSTRACT

A disc cartridge has a spindle hole, a head insertion hole and a shutter for opening and closing the two holes, the shutter being urged by an elastic member and having an elongated arm whose distal end engages with a guide groove formed on a guide portion of the cartridge.

18 Claims, 13 Drawing Sheets

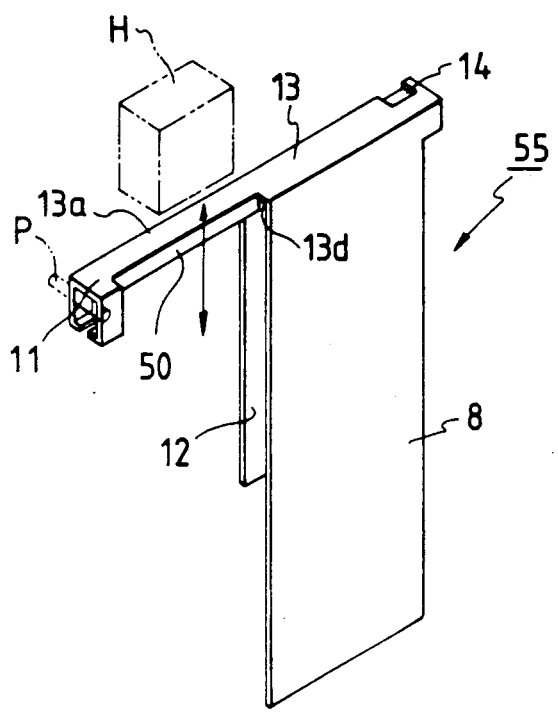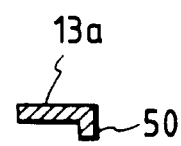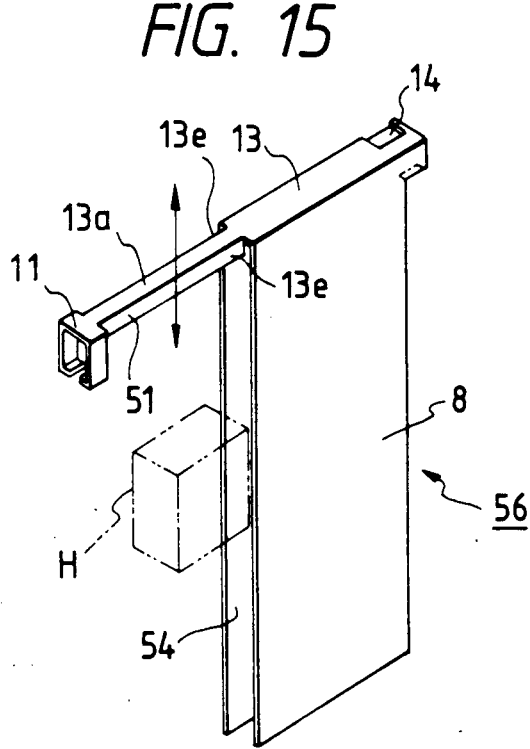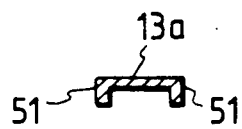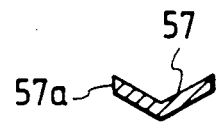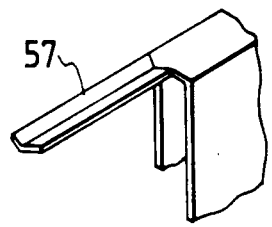

DISC CARTRIDGE HAVING A SLIDINGLY MOVABLE SHUTTER

BACKGROUND OF THE INVENTION

The present invention relates to a disc cartridge for encasing a recording medium such as an optical disc or a magnetic disc.

In general, a magnetic disc or an optical disc is encased in a cassette case made of two shell halves. A hole into which a spindle for rotating the disc is to be inserted is formed in a central portion of the cassette case. Adjacent to the spindle hole, a head insertion hole into which a write and read head is to be inserted is formed in the radial direction to traverse the recording surface of the disc. The head insertion hole is opened and closed by a shutter having an opening corresponding to the head insertion hole.

However, in this disc cartridge, only the head insertion hole is closed by the shutter in a state wherein the spindle hole is exposed to the atmosphere. In this manner, if the spindle hole is exposed to the atmosphere, dust enters inside the cartridge to contaminate the surface of the disc.

Moreover, since an opening of the shutter for opening and closing the spindle hole is simply formed so as to cut a rectangle portion of a planar plate of the cartridge a write and read head cannot be inserted close to the surface of the disc when the head is inserted into the head insertion hole along the surface of the cartridge.

In addition, the shutter is reciprocatingly moved, along a guide portion of the cartridge, by a drive pin provided in a recording and reproducing apparatus (player) and, however, the shutter cannot be smoothly moved because of various defects of the guide portion thereof.

SUMMARY OF THE INVENTION

It is an object to provide a cartridge in which all openings of a cartridge can be closed and a shutter can be smoothly moved.

It is another object to provide a cartridge in which a shutter is formed so that a write and read head is smoothly inserted in a longitudinal direction of a head insertion hole.

According to this invention, there is provided a disc cartridge for accommodating a disc therein, which comprises; a spindle hole into which a spindle is inserted to rotate the disc: a head insertion hole into which a read and/or write head is inserted and which is located adjacent to the spindle hole; and a shutter for closing and opening the spindle hole and the head insertion hole at the same time, which is slidingly moved along a guide portion formed at the front end of the cartridge, opposed to a recording and reproducing apparatus, which is urged by an elastic member in the direction where the spindle hole and.the head insertion hole are closed, and which is formed in such a manner that a sheet of plate material is bent to provide a pair of closing plates opposite to each other, at least one of the two closing plates closing the spindle hole and the head insertion hole at the same time, a bent portion between the two closing plates forming a slide portion for engaging with the guide portion, the slide portion having an elongated arm extending in its longitudinal direction, one end of the elastic member being fixed to one end of the slide portion, a guide groove engagement portion for engaging with a guide groove provided on the guide portion being formed at a front end of the elongated arm.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompanying drawings:

FIG. 13 is a perspective view of a cartridge of one-side type, showing a fifth embodiment of this invention;

FIG. 14 is a cross-sectional view of an elongated arm of the cartridge of FIG. 13;

FIG. 15 is a perspective view of a cartridge of double-side type, showing a sixth embodiment of this invention;

FIG. 16 is a cross-sectional view of an elongated arm of the cartridge in FIG. 15;

FIG. 17 is a partial perspective view of another elongated arm;

FIG. 18 is a cross-sectional view of the elongated arm in FIG. 17;

DETAILED DESCRIPTION OF THE INVENTION

Figure 1:
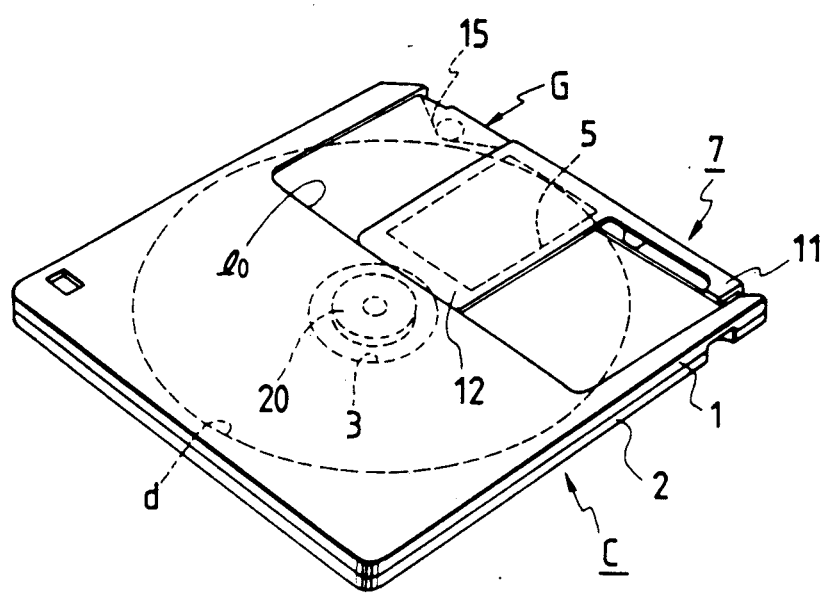
FIG. 1 is a perspective view of a cartridge, as viewed from the side of an upper shell half, showing a first embodiment of this invention.
Figure 2:
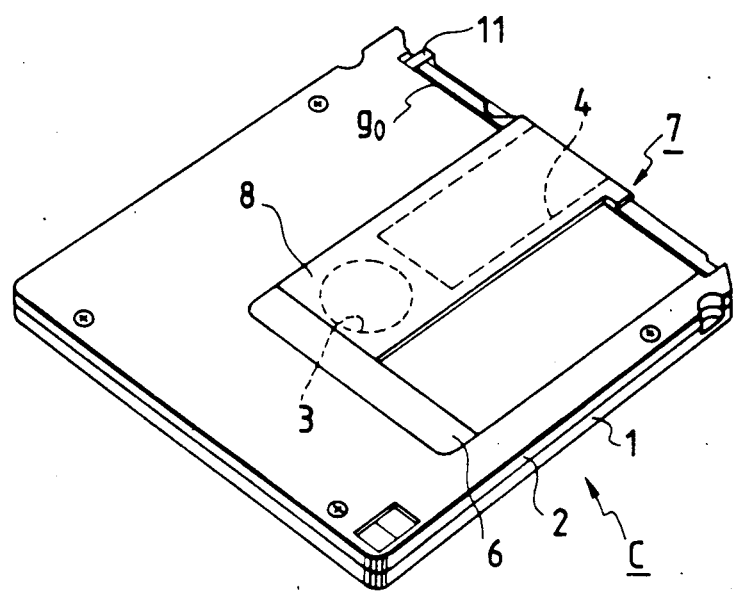
FIG. 2 is a perspective view, as viewed from the side of a lower shell half, showing the first embodiment of this invention.

FIG. 1 shows the front side of a cartridge C of one-side type in which informations are recorded on only one side of an optical disc or a magnetic disc, and FIG. 2 shows the back side of the cartridge C.

Figure 3:
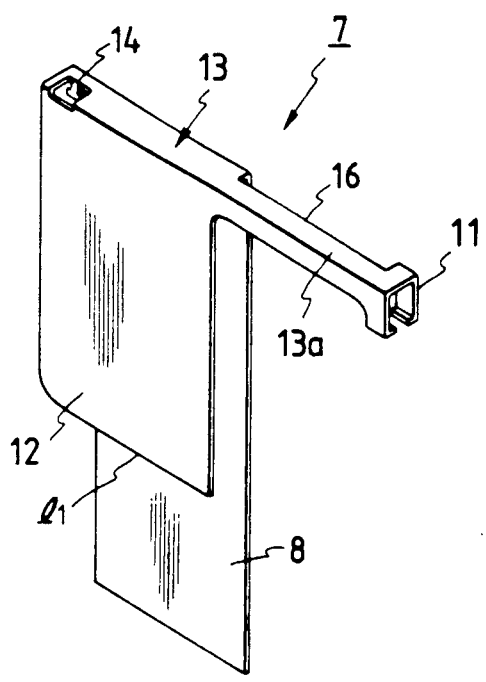
FIG. 3 is a perspective view of a shutter as viewed in a certain direction.
Figure 4:
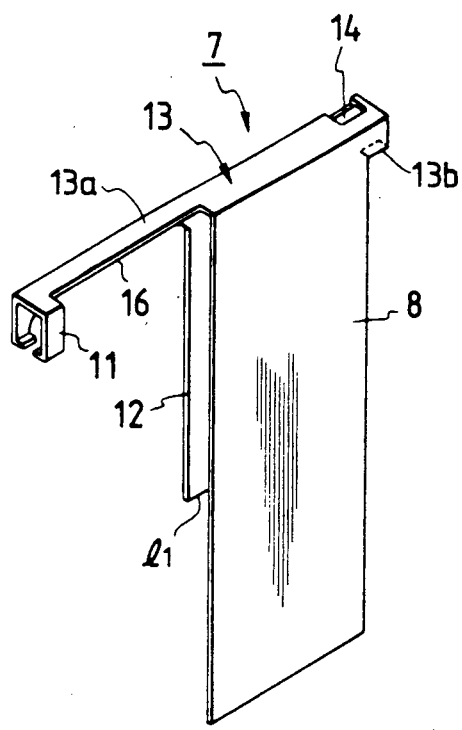
FIG. 4 is a perspective view of the shutter in FIG. 3 as viewed in another direction.

The cartridge C has an upper shell half 1 and a lower shell half 2 in alignment with each other. At the center portion of the lower shell half 2 is formed a spindle hole 3 into which a spindle is inserted for rotating a disc d accommodated therein. A hub 20 provided at the center portion of the disc d is engaged with the spindle hole 3. A head insertion hole 4 is formed adjacent to the spindle hole 3 so that a write and read head is inserted into the spindle hole 3. The write and read head may be a read head which is not provided with a writing function. The upper shell half 1 has a magnetic bias hole 5 into which a magnetic head is inserted when information is recorded again. In this cartridge, a spindle hole is not formed on the upper half shell 1. A shutter 7 is slidably provided at a guide portion G located at the end portion on the side of a recording and reproducing appatatus (player) in order to open and close the three holes. The shutter 7 is formed of a single metal sheet such as a stainless plate as shown in FIGS. 3 and 4. The shutter 7 has a long closing plate 8 whose lower end is guided by a retainer plate 6 (FIG. 2). A short closing plate 12 is provided opposite to the long closing plate 8 whose lower end forms a guiding side $l_1$ abutting against a guiding side $l_0$ provided on the upper shell half 1 of the cartridge C (FIG. 1).

At the bent portion of the shutter 7 is formed a slide portion 13 which has an elongated arm 13a extended from the bent portion. The slide portion 13 engages with the guide portion G formed at the end portion of the cartridge C on the side of a recording and reproducing apparatus when the cartridge C is inserted thereinto. The slide portion 13 has a guide groove engagement part 11 at its one end while the slide portion 13 has a spring engagement part 14 at the opposite side of the guide groove engagement part 11, to which one end of a spring 15 is fixed for urging the shutter 7 in one direction.

In this manner, if the slide portion 13 is formed long and if the shutter 7 is slidingly moved while the guide groove engagement part 11 located at its distal end is engaged with a guide groove $g_0$ of the guide portion G, the shutter 7 can be stably slid. In addition, as the guide side $l_1$ is guided by the guide side $l_0$ formed on the upper shell half 1, the shutter 7 can be smoothly slid.

Figure 8:
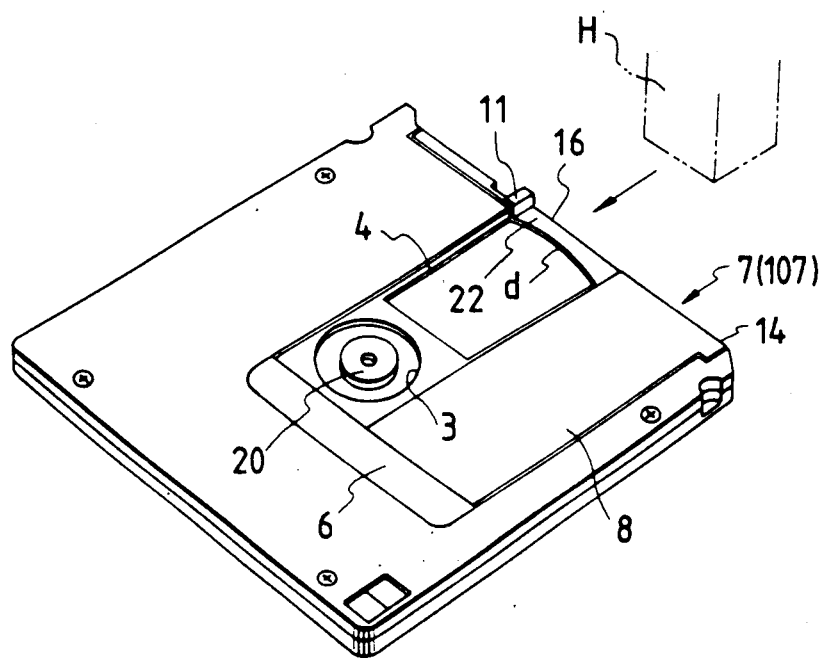
FIG. 8 is a perspective view of a cartridge in which a shutter is opened.

The elongated arm 13a of the slide portion has a cutout 16 through which the write and read head H can be smoothly inserted into the head insertion hole 4 along the elongated direction of the cartridge C as shown in FIG. 8. At the front end of the cartridge C is formed a cutout 22 corresponding to the cutout 16 of the elongated arm 13a.

These structures of the cartridge C make it possible to simultaneously close the spindle hole and the head insertion hole and to stably move the shutter. Further, the write and read head can be smoothly inserted into the head insertion hole 4 in its longitudinal direction.

Figure 5:
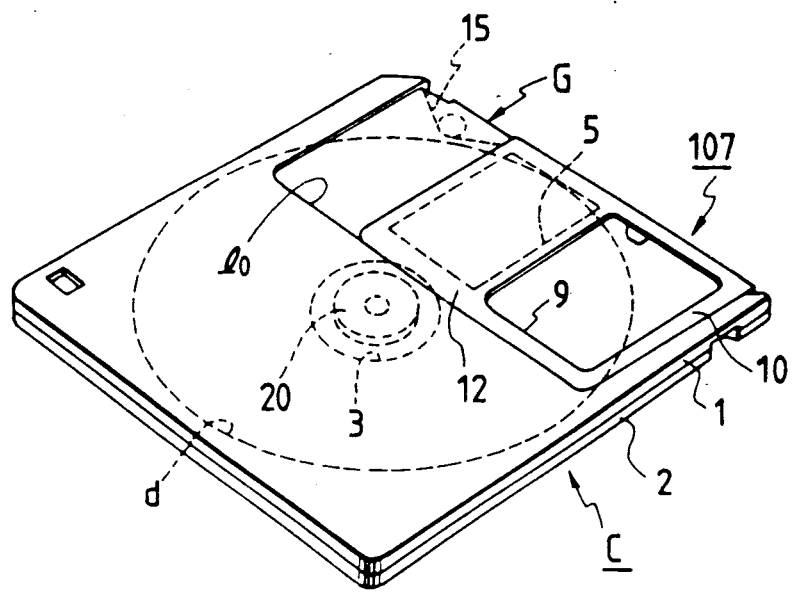
FIG. 5 is a perspective view of a cartridge showing a second embodiment of this invention.
Figure 6:
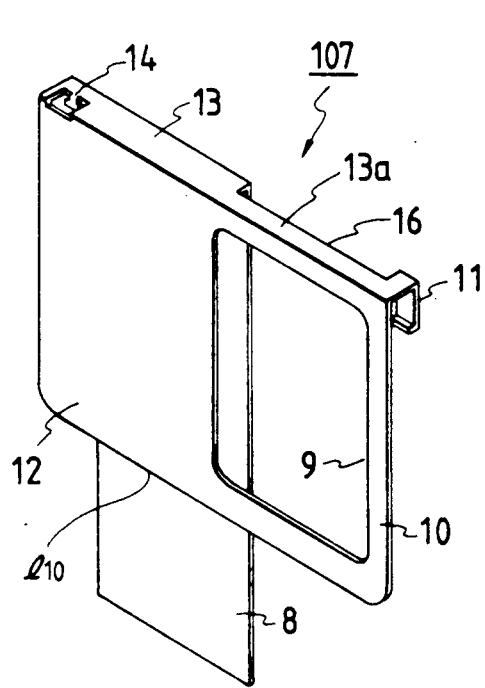
FIG. 6 is a perspective view of a shutter as viewed in a certain direction.

FIGS. 5. 6 and 7 shows another shutter 107. The shutter 107 has a window frame 10 integrally formed on the short closing plate 12. The window frame 10 defines a window 9 which is opposed to the magnetic bias hole 5 when the shutter 107 is opened. The lower ends of the short closing plate 12 and the window frame 10 form a long guide side $l_{10}$ which abuts against a guide side $l_0$ formed on the upper shell half 1 of the cartridge C.

Figure 9:
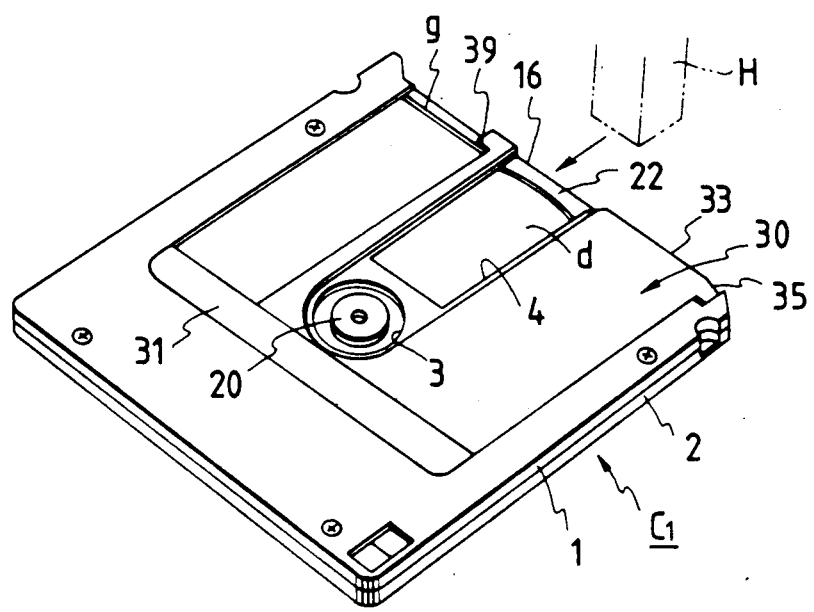
FIG. 9 is a perspective view of a cartridge of double-side disc type, showing a third embodiment of this invention.
Figure 10:
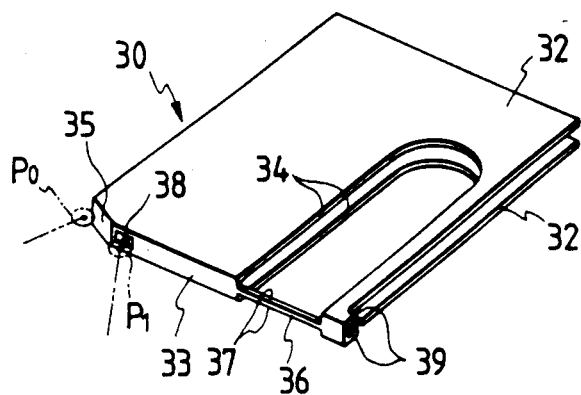
FIG. 10 is a perspective view of a shutter for a cartridge of double-side disc type.

FIG. 9 show an embodiment of a cartridge of a double-side type. This type of cartridge can be adapted for a double-side optical disc of 3.5 inches. The spindle hole 3 and the head insertion hole 4 are opened and closed by a shutter 30 (FIG. 10) whose lower end is guided by a retainer plate 31.

The shutter 30 is formed in such a manner that a sheet of stainless plate is bent at its enter portion. The shutter 30 has a pair of closing plates 32, 32 opposed to each other and a slide portion 33 at its bent portion. The slide portion 33 engages with the front side of the cartridge $C_1$. Each closing plate 32 has a window 34 at a position opposed to each of the spindle hole 3 and the head insertion hole 4. When the two windows 34 are opposed to the two holes 3, 4, respectively, the two holes 3, 4 are opened. The shutter 30 is urged by a spring (not shown) in the direction where the two holes 3, 4 are closed. The slide portion 33 has a recess 38 for receiving a drive pin $P_1$ of the recording and reproducing apparatus. The shutter 30 is slidingly moved by the drive pin $P_1$ and is returned to an original position to close the two holes 3, 4 when the drive pin $P_1$ releases the shutter 30.

At one end of the slide portion 33 is formed a slanting surface 35 for guiding smoothly a so-called useless pin, i.e., unnecessary opening and closing pin $P_o$. The slide portion 33 has an elongated arm 36 at a position corresponding to the windows 34. The opposite ends of the elongated arm 36 in its lateral direction are provided with a pair of cutouts 37, 37 each of which correspond to the cutout 22 of the front end of the cartridge (FIG. 9). These cutouts 22, 37 make it possible to guide smoothly the write and read head H into the head insertion hole 4. The elongated arm 37 has a guide groove engagement portion 39 at its distal end.

Figure 11:
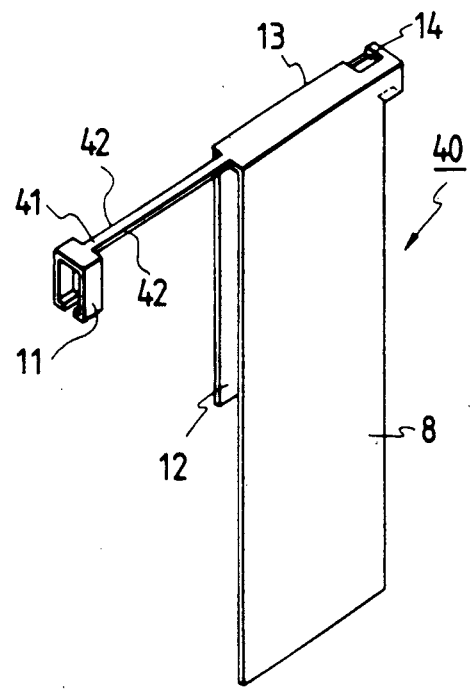
FIG. 11 is a perspective view of a shutter for a cartride of write and read type, showing a fourth embodiment of this invention.

FIG. 11 shows a modified embodiment of the shutter shown in FIGS. 3 and 4. A shutter 40 has an elongated arm 41 whose opposite sides are cut away to form a pair of cutouts 42, 42, respectively.

Figure 12:
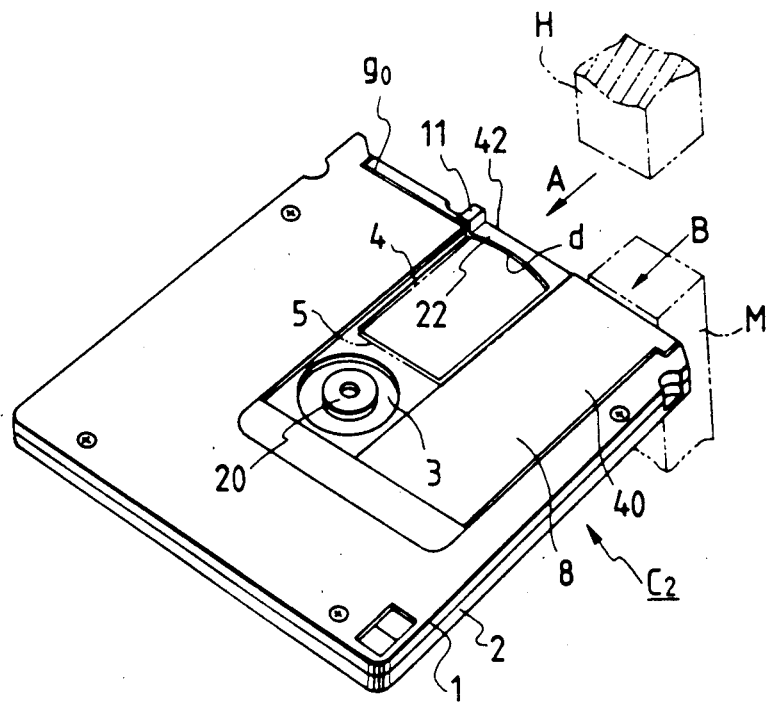
FIG. 12 is a perspective wiew of a cartridge provided with the shutter in FIG. 11.

The function of the shutter 40 will now be explained with respect to FIG. 12.

First, when the information on the disc d is read, the shutter 40 is moved by a drive pin (not shown) to open the head insertion hole 4. Then, the write and read head H is inserted into the head insertion hole 4 in the direction indicated by an arrow A. The head H reads the informations on the disc d accommodated in the cartridge $C_2$. At this time, the formation of the two cutouts 22, 42 make it possible to guide the head H close to the surface of the disc d. Further, when informations on the disc d are written, a magnetic head M is inserted into the magnetic bias hole 5 in the direction indicated by an arrow B at the same time when the write and read head H is inserted into the head insertion hole 4. Also, at this time, the formation of the cutout 42 makes it possible to guide the head M close to the surface of the disc d thereby to increase ability for writing and reading the informations.

In case that the above elongated arms have the cutouts, the strength of the arms become low. Therefore, it is desirable to reinforce the weak elongated arms as shown in FIGS. 13 to 18. In FIGS. 13 and 14, the elongated arm 13a has a reinforcing piece 50 at its one side, which is formed in a manner that a cutout portion 13d is bent downwardly. The reinforcing piece 50 can effectively prevent the deformation of the elongated arm when the drive pin P pushes the guide groove engagement portion to move the shutter 55. Moreover, the reinforcing piece 50 is bent perpendicular to the surface of the elongated arm to avoid obstruction of smooth insertion of the head H.

The shutter 55 in FIG. 13 is of the one-side type. In contrast, FIG. 15 shows a shutter 56 of double-side type. The shutter 56 has a pair of long closing plates 8, 54 opposed to each other, and its elongated arm 13a has a pair of reinforcing pieces 51, 51 at its both ends, which are formed in a manner that a pair of cutouts 13e, 13e are bent perpendicular to the surface of the elongated arm 13a (FIG. 16). The reinforcing pieces can guide the head H close to the surface of the disc d.

An elongated arm 57 shown in FIGS. 17 and 18 has a configuration of an inverted mountain. In this case, the opposite end faces of the elongated arm 57 are extended in the direction of the insertion of the head H.

Figure 19:
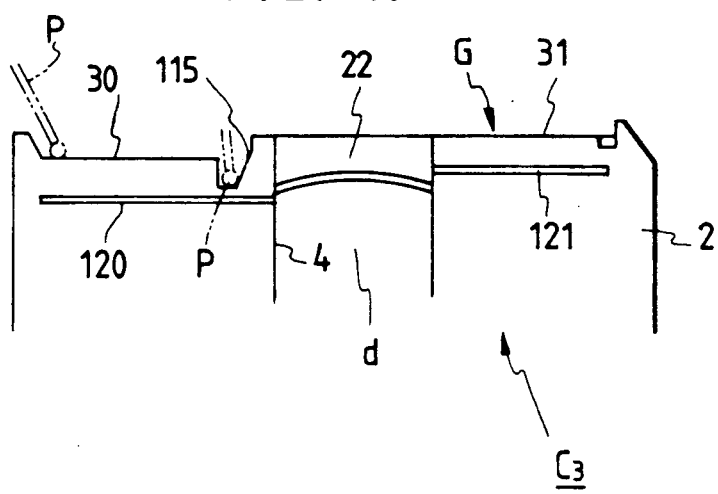
FIG. 19 is a plan view of a lower shell half of a cartride, showing a seventh embodiment of this invention.

The guide portion G of the cartridge $C_3$ has, as shown in FIG. 19, a first guide surface 30 located at a downward position dropped from the upper end of the cartridge $C_3$ and a second guide surface 31 at an upward position opposite to the first guide surface 30 with respect to the head insertion hole 4.

Between the first and second surfaces 30, 31 is formed the cutout 22 corresponding to the cutouts of elongated arms of the above shutters 7, 30, 40, 55, 56 107. A recess 115 for receiving the drive pin P is formed between the first surface 30 and the cutout 22. The drive pin P drops into the recess 115 when a shutter is moved to the right as viewed in FIG. 19 thereby to open completely the head insertion hole 4.

Figure 7:
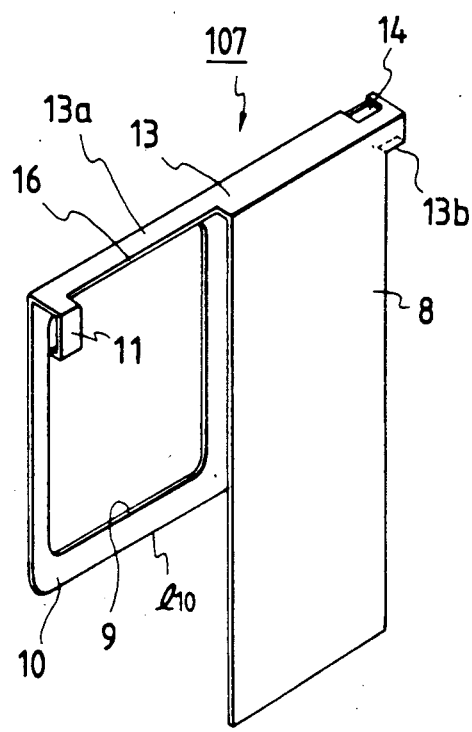
FIG. 7 is a perspective view of the shutter in FIG. 6 as viewed in another direction.

Near the guide portion G of the lower shell half 2 are formed a first guide groove 120 and a second guide groove 121 located opposite to the first guide groove 120. These two grooves 120, 121 are extended through substantially total length of left and right parts of the cartridge $C_3$. The first guide groove 120 is engaged with the guide groove engagement portion of the shutter 7, 40, 55, 56 107, while the second guide groove 121 is engaged with a guide groove engagement portion 13b (FIGS. 4 and 7) located opposite to the portion 11. The first guide groove 120 is formed at a position lower than the bottom of the recess 115 while the second guide groove 121 is formed at a position above that of the first guide groove 120. The arrangement of the first and second guide grooves 120, 121 makes it possible to move the shutter steadily.

Figure 20:
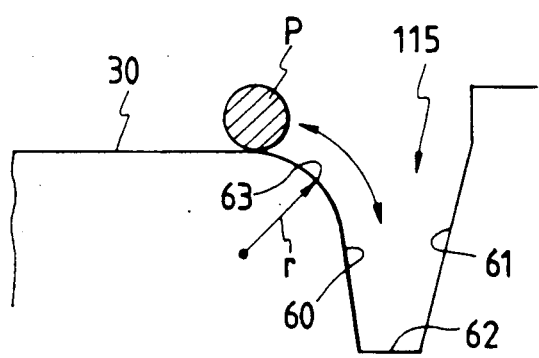
FIG. 20 is an enlarged view of a recess for receiving a drive pin.
Figure 21:
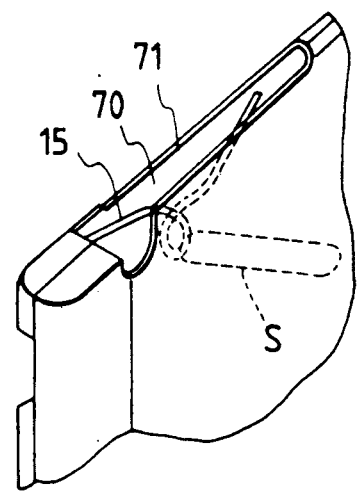
FIG. 21 is an enlarged view of a spring accommodating space of a cartridge, showing a ninth embodiment of this invention.

The recess 115 has, as shown in FIG. 20, a first guide face 60 for guiding the drive pin P and a second guide face 61 opposite to the first guide face 60 and a bottom face 62. At an intersecting position of the first guide surface 30 and the first guide face 60 is formed a curved surface 63 having a radius of r. The curved surface can guide smoothly the drive pin P into the recess 115 and, further, the amount of wear of the intersecting portion between the first guide surface 30 and the first guide face 60 becomes less to avoid the contamination of the disc surface due to dust caused by the movement of the shutter. In addition, the smooth movement of the drive pin P makes it possible to slide the shutter smoothly.

Figure 22:
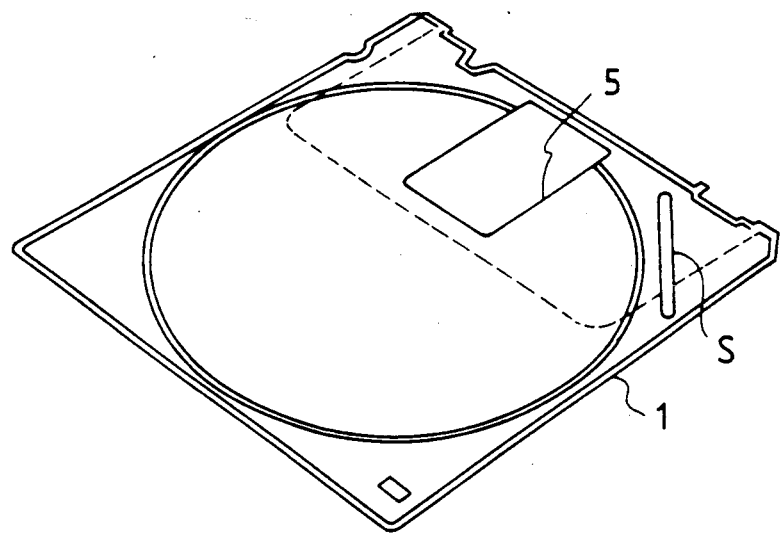
FIG. 22 is a perspective view of an upper shell half of a cartridge having a reinforcing rib.
Figure 23:
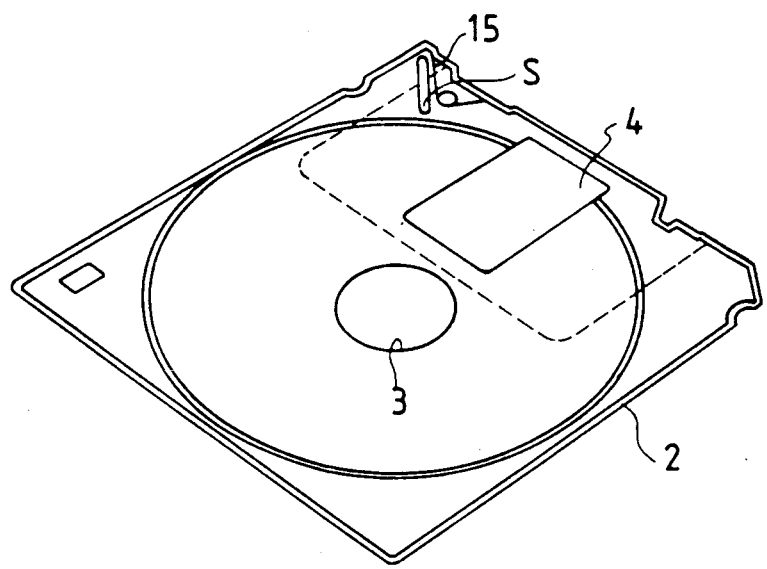
FIG. 23 is a perspective view of a lower shell half of a cartridge having a reinforcing rib.
Figure 24:
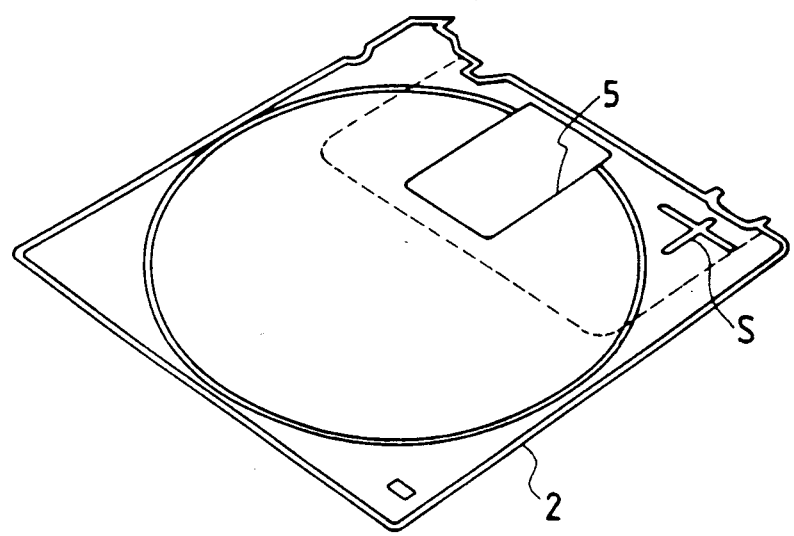
FIG. 24 is a perspective view of a lower shell half of a cartridge having a reinforcing rib in another form.
Figure 25:
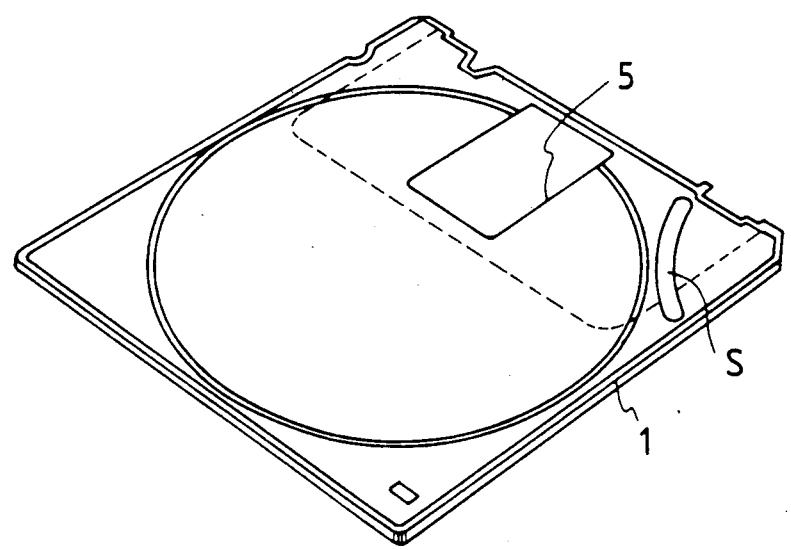
FIG. 25 is a perspective view of an upper shell half of a cartridge having a reinforcing rib in still another form.
Figure 26:
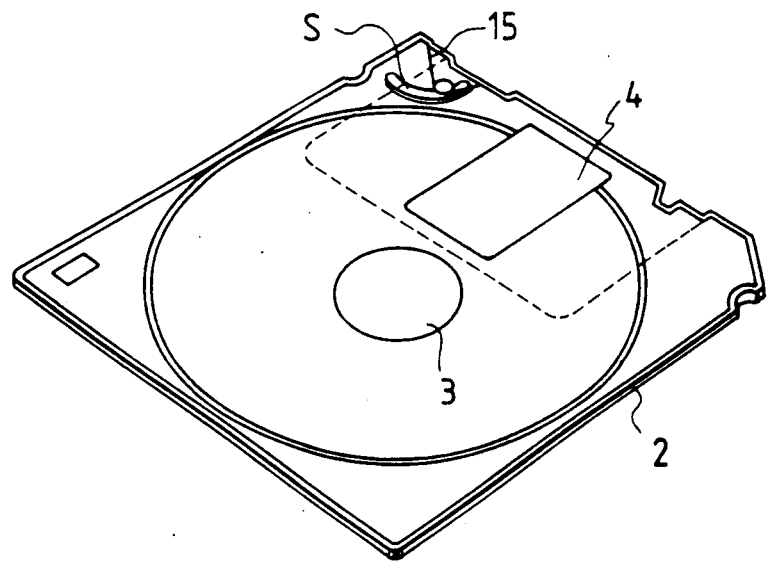
FIG. 26 is a perspective view of a lower shell half of a cartridge having a reinforcing rib in still another form.
Figure 27:
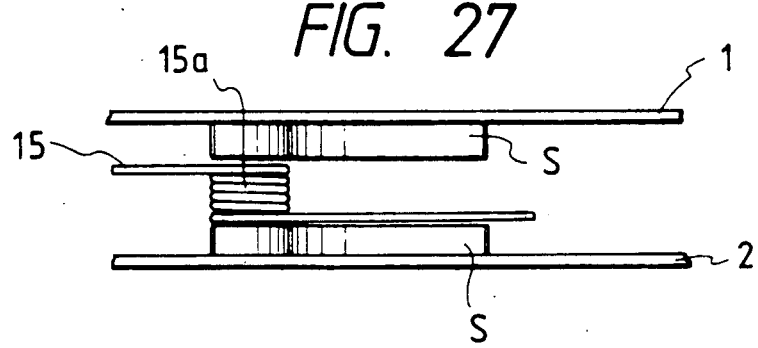
FIG. 27 is an elevational view of a spring accommodating space of a cartridge formed by the upper and lower shell halves in FIGS. 25 and 26, respectively.
Figure 28:
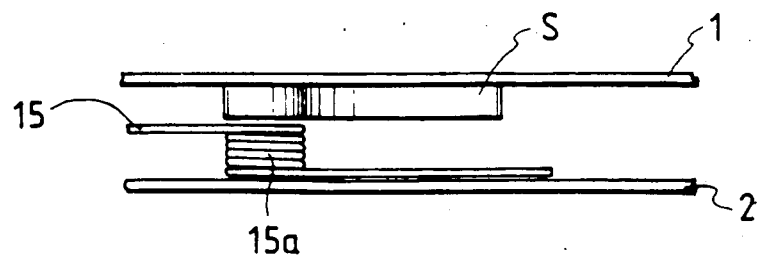
FIG. 28 is an elevational view of a spring accommodating space of a cartridge whose upper shell half has a reinforcing rib.

At the end face of a spring accommodating portion 70 is provided a spring insertion inlet 71 through which the spring 15 is inserted thereinto. A wall defining the portion 70 has a reinforcing rib S which is formed not to obstruct the movement of the spring 15 as shown in FIGS. 21 to 28. The formation of the reinforcing rib S can prevent the deformation of the walls defining the spring accommodating portion 70 thereby to enable the shutter to move smoothly. Two reinforcing ribs S formed on the upper and lower shell halves, respectively, may be intersected when the upper and lower shell halves are assembled. That is, one rib S is provided with the upper shell 1 to form a triangle corner together with the two end sides of the upper shell half as shown in FIG. 22 while the other rib S is provided with the lower shell 2 along a diagonal line as shown in FIG. 23. Further, as shown in FIG. 24, the reinforcing rib S may be in the form of a cross.

As shown in FIGS. 25 to 28, a reinforcing rib S may be in the form of an arc extending along the moving locus of a coil portion 15a of the coil spring 15 when the coil spring 15 is expanded and shrunken. The rib S may be formed on not only both shell halves 1, 2 but also either shell half 1 or 2. The rib S reinforces the wall of the cartridge and guides the coil portion 15a of the coil spring 15 thereby to enable the coil spring 15 to expand and shrink smoothly. This smooth movement of the spring 15 enables the shutter to move smoothly and steadily.

Figure 29:
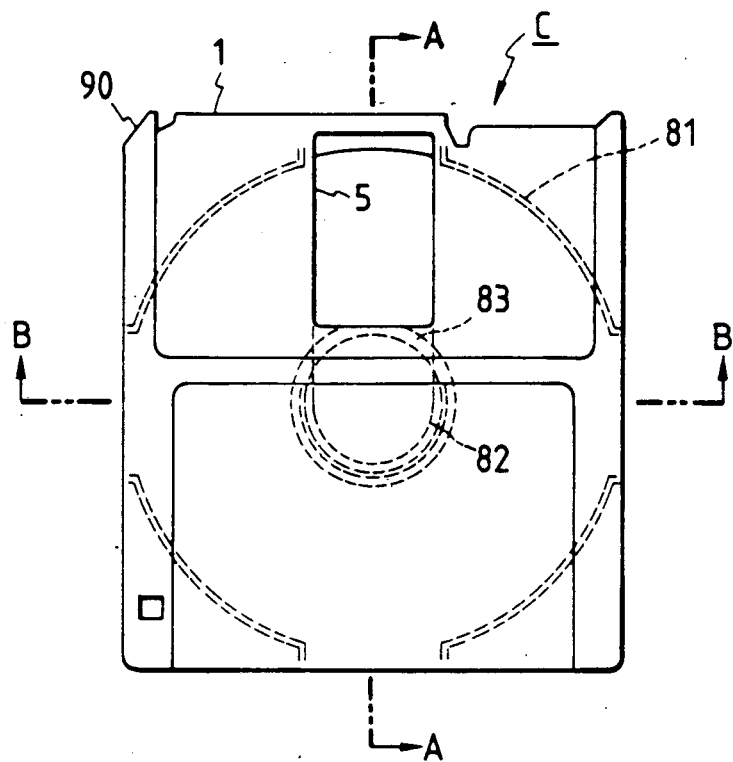
FIG. 29 is a plan view of a cartridge as viewed from the upper shell half thereof, showing a tenth embodiment.
Figure 30:
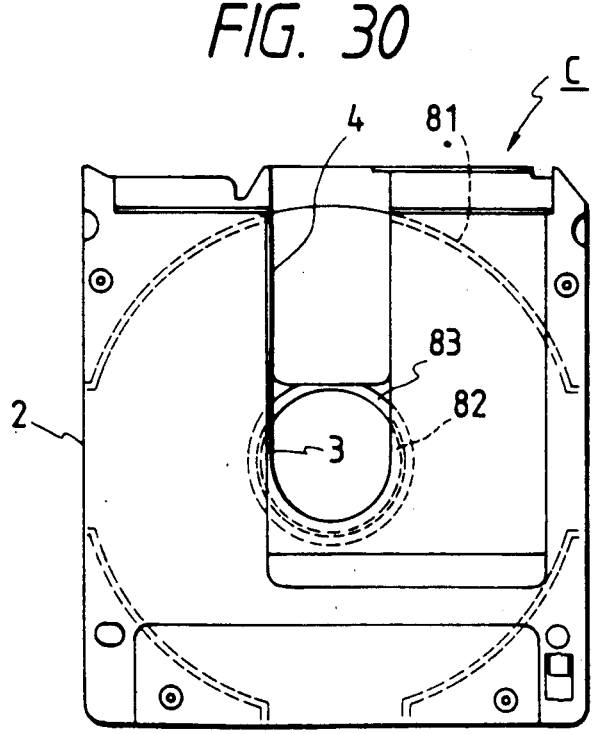
FIG. 30 is a plan view of a cartridge as viewed from the lower shell half thereof.
Figure 31:
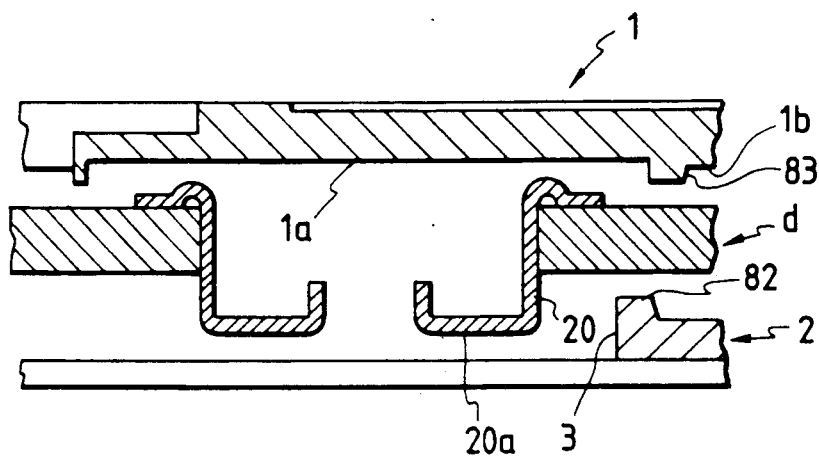
FIG. 31 is a cross-sectional view taken along the line A—A of FIG. 29.
Figure 32:
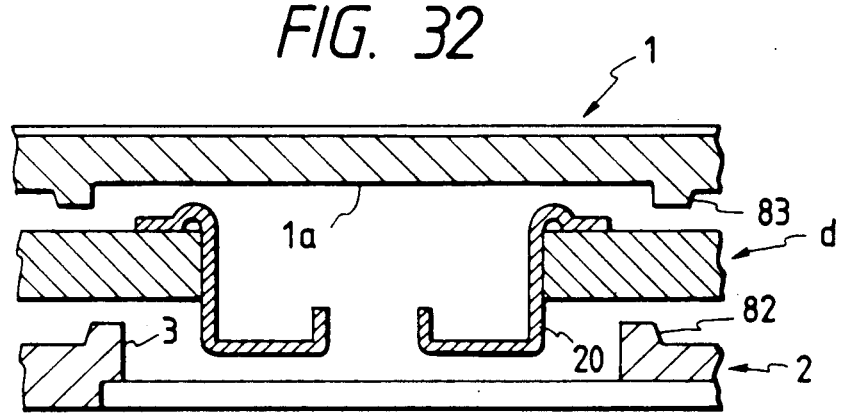
FIG. 32 is a cross-sectional view talken along the line B—B of FIG. 29.

FIGS. 29 and 30 shows two plan views of one-side cartridge as viewed from the front side and the back side, respectively. On the inner surfaces of the upper and lower shell halves 2 are formed two annular ribs 81, 81, respectively, in which a disc is accommodated. The inner surface of the upper shell half 1 has an annular rib 83 at its center portion, the diameter of which is slightly larger than that of the hub 20 of the disc d. The rib 83 is opposed to a non-recording portion of the disc d, on which informations are not recorded (FIGS. 31 and 32).

The height of the rib 83 projected from the inner surface 1b of the upper shell half 1 is determined at e.g., 0.3 mm and the depth of the recess, surrounded by the rib 83, dropped from the lower surface of the rib 83 is determined at e.g., 0.6 mm. In a normal disc, the height of the hub 20 projected from the surface of the disc d is about 0.6 mm. Accordingly, when the disc d is moved upwardly, the rib 83 abuts against the upper surface of the disc d to maintain a proper space between the disc d and the inner surface of the upper shell half 1. At this time, the hub 20 does not abut against the inner surface of the recess surrounded by the annular rib 83. The hub 20 is projected into the spindle hole 3 defined by an annular rib 82 thereby to refrain the movement of the disc d in its radial direction.

In FIG. 29, at the left front corner of the cartridge C is formed a slanted corner 90 which is located at a position opposite to that of a slanted corner of a conventional magnetic disc cartridge. The cartridge C is normally adapted for a optical disc. Therefore, there is no fear that an operator inserts, by mistake, a conventional magnetic disc into a recording and reproducing apparatus for a optical disc.

Figure 34:
FIG. 34 is an elevational view of a case wall of a case in FIG. 33.
Figure 33:
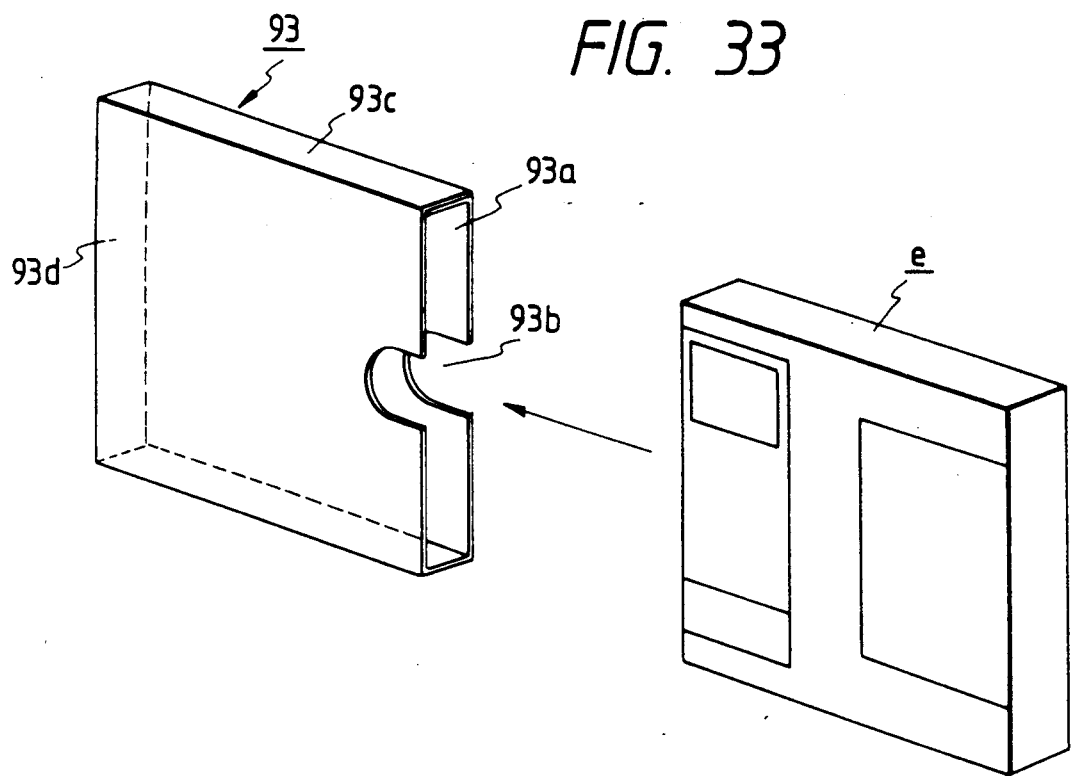
FIG. 33 is a perspective view of a cartridge and a case, showing an eleventh embodiment of this invention.
Figure 35:
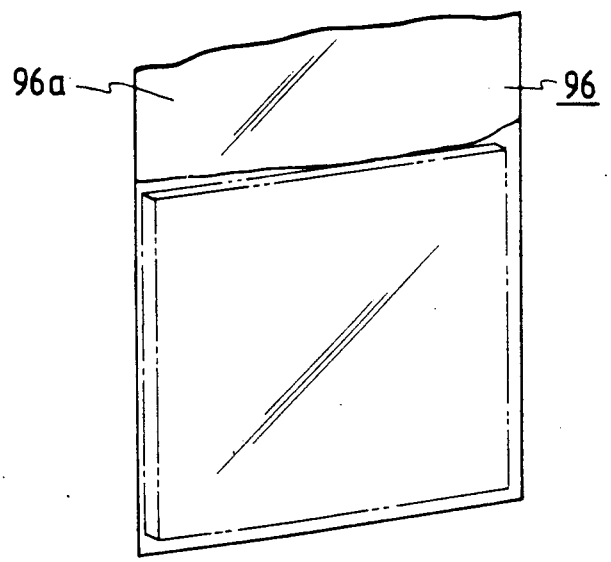
FIG. 35 is a perspective view of a bag accommodating therein the cartridge and the case in FIG. 33.

The cartridge C is accommodated in a case 93, as shown in FIG. 33, which is made of polypropylene having a thickness of about 0.5 mm. The case 93 has an inlet 93a which is provided with a pair of pick-up recesses 93b. When a user takes the cartridge out of the case 93, he holds the cartridge with his fingers through the pick-up recesses 93b. The inner wall of the case 93 is rough (sand-like surface) to prevent the slip of the cartridge from the inside of the case 93 (FIG. 34). A side surface 93c and a bottom surface 93d are bonded by a supersonic sealing operation.

The case 93 accommodating the disc cartridge C may be covered with a bag made of drawing polypropylene. Adhesive is applied to the covering piece 96a of the bag 96 to reliably close the inlet of the bag 96.

What is claimed is:

1. A disc cartridge for accommodating a disc therein, which comprises:
   a) a spindle hole into which a spindle is inserted to rotate the disc;
   b) a head insertion hole into which a read and/or write head is inserted and which is located adjacent to the spindle hole; and
   c) a shutter for closing and opening the spindle hole and the head insertion hole at the same time, which is slidingly moved along a guide portion formed at a front end of the cartridge, opposed to a recording and reproducing apparatus, which is urged by an elastic member in the direction where the spindle hole and the head insertion hole are closed, and which is formed in a manner that a single sheet of plate material is bent to provide a pair of closing plates opposite to each other, at least one of the two closing plates closing the spindle hole and the head insertion hole at the same time, a bent portion between the two closing plates forming a slide portion for engaging with the guide portion, the slide portion having an elongated arm projected from front portions of the closing plates in the longitudinal direction of the bent portion, one end of the elastic member being fixed to a rear end of the slide portion and an other end of the elastic member engaging the cartridge, a pair of guide groove engagement portions for engaging with at least one guide groove formed on the guide portion and being formed at a front end of the elongated arm and at a rear end of at least one closing plate, respectively, and the guide portion having a recess into which a drive pin is dropped when the drive pin completely opens the shutter and the guide groove for guiding the guide groove engagement portion of the elongated arm on both sides of the head insertion hole, the guide groove being formed at a position deeper that that of the bottom of the recess without crossing the recess.

2. A disc cartridge according to claim 1, wherein the two closing plates of the shutter are of the same length as each other.

3. A disc cartridge according to claim 1, wherein the elongated arm of the slide portion has a reinforcing structure to avoid a deformation thereof when the drive pin pushes the front guide groove engagement portion of the elongated arm.

4. A disc cartridge according to claim 1, wherein the recess has a curved surface for guiding the drive pin.

5. A disc cartridge according to claim 1, wherein a wall surrounding an accommodating space for accommodating the elastic member has a reinforcing structure.

6. A disc cartridge according to claim 5, wherein the reinforcing structure comprises a reinforcing rib and the elastic member comprises a coil spring, the reinforcing rib being formed along a moved locus of a coil portion of the coil spring.

7. A disc cartridge according to claim 1, wherein said pair of closing plates of the shutter comprise a long closing plate for simultaneously closing the spindle hole and the head insertion hole and a short plate having the same width as that of the long closing plate and a length shorter than that of the long closing plate, the elongated arm being extended from a bent portion between said long and short closing plates.

8. A disc cartridge according to claim 7, wherein one side of the elongated arm is cut away to form a cutout for passing the head at a position close to the surface of the disc toward the head insertion hole, a cutout being formed on the front end of the cartridge, corresponding to the cutout of the elongated arm.

9. A cartridge according to claim 7, wherein both sides of the elongated arm are cut away to form two cutouts, one of which functions to pass a write and read head at a position close to the surface of the disc toward the head insertion hole and the other one of which functions to pass a magnetic head at a position close to the surface of the disc toward a magnetic head insertion hole.

10. A disc cartridge according to claim 7, wherein a window frame, which includes a distal side disposed remote with respect to said bent portion, is formed integrally with the short closing plate and one side of the elongated arm, the short closing plate having a distal side disposed remote with respect to said bent portion and being integrally connected to the distal side of the window frame in a flush manner to form a long guide side.

11. A disc cartridge according to claim 10, wherein one side of the elongated arm is cut away to form a cutout for passing the head at a position close to the surface of the disc toward the head insertion hole, a cutout being formed on the front end of the cartridge, corresponding to the cutout of the elongated arm.

12. A disc cartridge for accommodating a disc therein, which comprises:
   a) a spindle hole into which a spindle is inserted to rotate the disc;
   b) a head insertion hole into which a read and/or write head is inserted and which is located adjacent to the spindle hole; and
   c) a shutter for closing and opening the spindle hole and the head insertion hole at the same time, which is slidingly moved along a guide portion formed at a front end of the cartridge, opposed to a recording and reproducing apparatus, which is urged by an elastic member in the direction where the spindle hole and the head insertion hole are closed, and which is formed in a manner that a single sheet of plate material is bent to provide a pair of closing plates opposite to each other, at least one of the two closing plates closing the spindle hole and the head insertion hole at the same time, each of the closing plates being of the same length and having a window at a position opposed to each of the spindle hole and the head insertion hole, a bent portion between the two closing plates forming a slide portion for engaging with the guide portion, the slide portion having an elongated arm at a position corresponding to the window, one end of the elastic member being fixed to a rear end of the slide portion and an other end of the elastic member engaging the cartridge, a pair of guide groove engagement portions for engaging with at least one guide groove formed on the guide portion and being formed at front ends of the two closing plates and rear ends of the closing plates, both sides of the elongated arm being cut away to form a pair of cutouts for passing the head at a position close to the surface of the disc toward the head insertion hole, a pair of cutouts being formed on a front end of the cartridge, corresponding to the cutouts of the elongated arm, and the guide portion having a recess into which a drive pin is dropped when the drive pin completely opens the shutter and the guide groove for guiding one of the guide groove engagement portions formed on the elongated arm on both sides of the head insertion hole, the guide groove being formed at a position deeper than that of the bottom of the recess without crossing the recess.

13. A disc cartridge according to claim 12, wherein the elongated arm of the slide portion has a reinforcing structure to avoid a deformation thereof when the drive pin pushes one of the guide groove engagement portions formed on the elongated arm.

14. A disc cartridge according to claim 12, wherein the recess has a curved surface for guiding the drive pin.

15. A disc cartridge according to claim 12, wherein the slide portion is formed between the two closing plates having, at a rear end of the slide portion, a slanting surface for guiding one drive pin which does not contribute to opening the shutter when another pin is engaged with the shutter for opening the same.

16. A disc cartridge according to claim 15, wherein both cutouts for passing the head at a position close to the surface of the disc toward the head insertion hole, two cutouts being formed on a front end of the cartridge, corresponding to the cutouts of the elongated arm, respectively.

17. A disc cartridge according to claim 12, wherein a wall surrounding an accommodating space for accommodating the elastic member has a reinforcing structure.

18. A disc cartridge according to claim 17, wherein the reinforcing structure comprises a reinforcing rib and the elastic member comprises a coil spring, the reinforcing rib being formed along a moving locus of a coil portion of the coil spring.

* * * * *